US012659972B2

(12) United States Patent
Hosseini et al.

(10) Patent No.: US 12,659,972 B2
(45) Date of Patent: Jun. 16, 2026

(54) SIDELINK RESOURCE SCHEDULING

(71) Applicant: QUALCOMM Incorporated, San Diego, CA (US)

(72) Inventors: Seyedkianoush Hosseini, San Diego, CA (US); Wei Yang, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 18/263,457

(22) PCT Filed: Apr. 14, 2022

(86) PCT No.: PCT/US2022/071720
§ 371 (c)(1),
(2) Date: Jul. 28, 2023

(87) PCT Pub. No.: WO2022/221859
PCT Pub. Date: Oct. 20, 2022

(65) Prior Publication Data
US 2024/0089992 A1 Mar. 14, 2024

(30) Foreign Application Priority Data
Apr. 15, 2021 (GR) .............................. 20210100268

(51) Int. Cl.
*H04W 72/25* (2023.01)
*H04L 5/00* (2006.01)
*H04W 72/0453* (2023.01)

(52) U.S. Cl.
CPC ........... *H04W 72/25* (2023.01); *H04L 5/0094* (2013.01); *H04W 72/0453* (2013.01)

(58) Field of Classification Search
CPC .. H04W 72/25; H04W 72/0453; H04L 5/0094
See application file for complete search history.

(56) References Cited

U.S. PATENT DOCUMENTS

2019/0089502 A1 3/2019 Yi et al.
2020/0382267 A1 12/2020 Soriaga et al.
(Continued)

FOREIGN PATENT DOCUMENTS

CN 111356240 A 6/2020
WO WO-2019029733 A1 2/2019
(Continued)

OTHER PUBLICATIONS

International Search Report and Written Opinion—PCT/US2022/071720—ISA/EPO—Jul. 7, 2022.

*Primary Examiner* — Duc C Ho
(74) *Attorney, Agent, or Firm* — Harrity & Harrity, LLP

(57) ABSTRACT

In an example wireless communication method, a user equipment (UE) may transmit a sidelink resource reservation, where the sidelink resource reservation indicates a first resource in an uplink slot with a first bandwidth available for the sidelink resource reservation and a second resource in a sub-band full duplex (SBFD) slot with a second bandwidth available for the sidelink resource reservation, and where the sidelink resource reservation uses a same sub-channel indexing configuration for the uplink slot and the SBFD slot. The UE may transmit a communication using the sidelink resource reservation.

30 Claims, 12 Drawing Sheets

900 →

910 → Transmit a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot 920 → Transmit a communication using the sidelink resource reservation

(56)　　　　　References Cited

U.S. PATENT DOCUMENTS

2021/0400689  A1 *　12/2021　Wang ................... H04W 76/14
2022/0116913  A1 *　 4/2022　Hosseini .............. H04W 72/56

FOREIGN PATENT DOCUMENTS

WO　　　　　2020069111  A1　　4/2020
WO　　　WO-2020061821  A1　　4/2020

\* cited by examiner

800
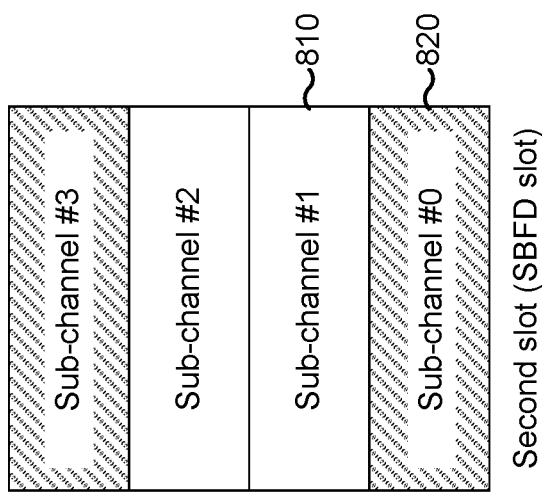
Sub-channel #3
Sub-channel #2
Sub-channel #1
Sub-channel #0
First slot (UL slot)
810
820
Sub-channel #3
Sub-channel #2
Sub-channel #1
Sub-channel #0
Second slot (SBFD slot)
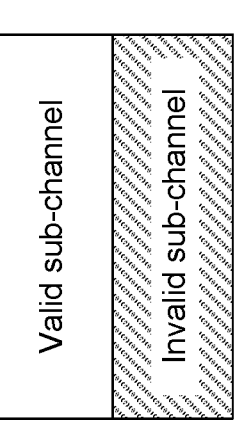
Valid sub-channel
Invalid sub-channel
FIG. 8

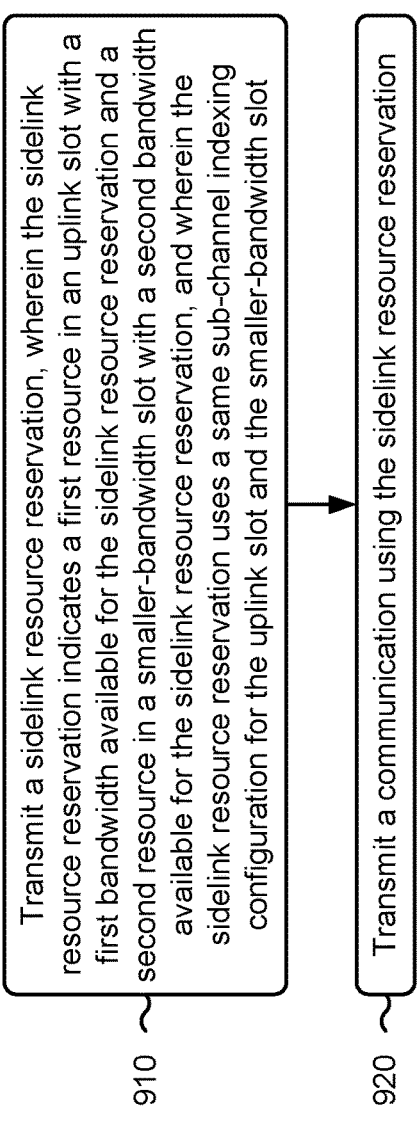

910 Transmit a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot 920 Transmit a communication using the sidelink resource reservation

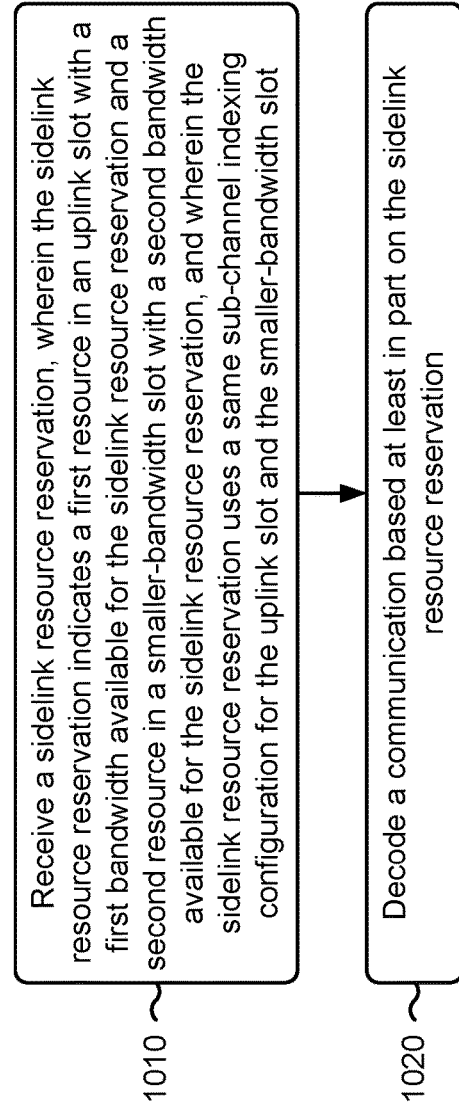

1010 — Receive a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot

1020 — Decode a communication based at least in part on the sidelink resource reservation

SIDELINK RESOURCE SCHEDULING

CROSS-REFERENCE TO RELATED APPLICATIONS

This Patent Application is a 371 national stage of PCT Application No. PCT/US2022/071720 filed on Apr. 14, 2022, entitled "SIDELINK RESOURCE SCHEDULING," which claims priority to Greece Patent Application Serial No. 20210100268, filed on Apr. 15, 2021, entitled "SIDE-LINK RESOURCE SCHEDULING," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for sidelink resource scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and transmitting a communication using the sidelink resource reservation.

In some aspects, a method of wireless communication performed by a UE includes receiving a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and decoding a communication based at least in part on the sidelink resource reservation.

In some aspects, a UE for wireless communication includes a memory and one or more processors, coupled to the memory, configured to: transmit a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and transmit a communication using the sidelink resource reservation.

In some aspects, a UE for wireless communication includes a memory and one or more processors, coupled to the memory, configured to: receive a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and decode a communication based at least in part on the sidelink resource reservation.

In some aspects, a non-transitory computer-readable medium storing a set of instructions for wireless communication includes one or more instructions that, when executed by one or more processors of a UE, cause the UE to: transmit a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and transmit a communication using the sidelink resource reservation.

In some aspects, a non-transitory computer-readable medium storing a set of instructions for wireless communication includes one or more instructions that, when executed by one or more processors of a UE, cause the UE to: receive a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and decode a communication based at least in part on the sidelink resource reservation.

In some aspects, an apparatus for wireless communication includes means for transmitting a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and means for transmitting a communication using the sidelink resource reservation.

In some aspects, an apparatus for wireless communication includes means for receiving a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and means for decoding a communication based at least in part on the sidelink resource reservation.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example of sub-channel indexing associated with sidelink resource scheduling, in accordance with the present disclosure.

FIGS. 9-10 are diagrams illustrating example processes performed by a user equipment, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
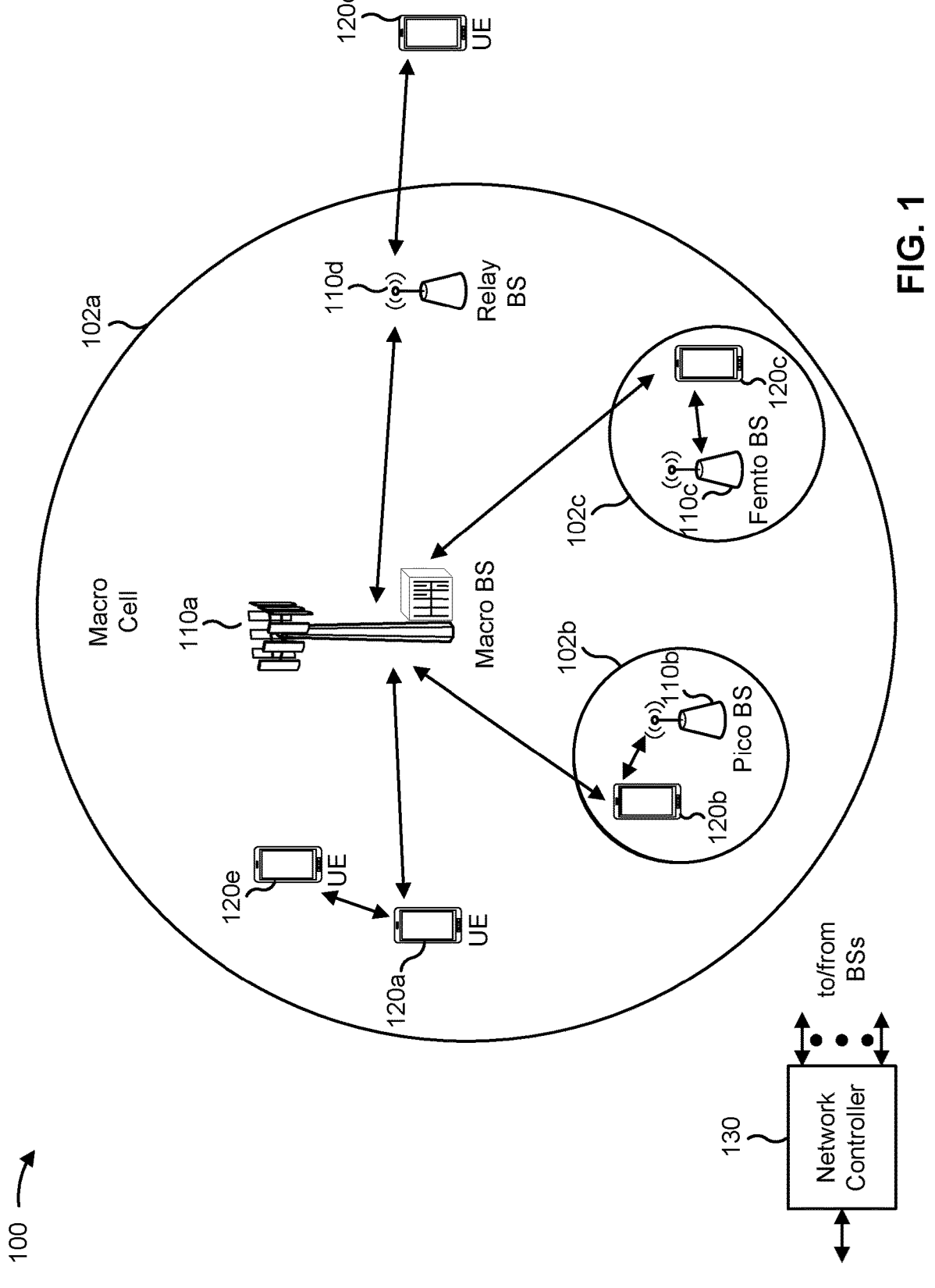
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
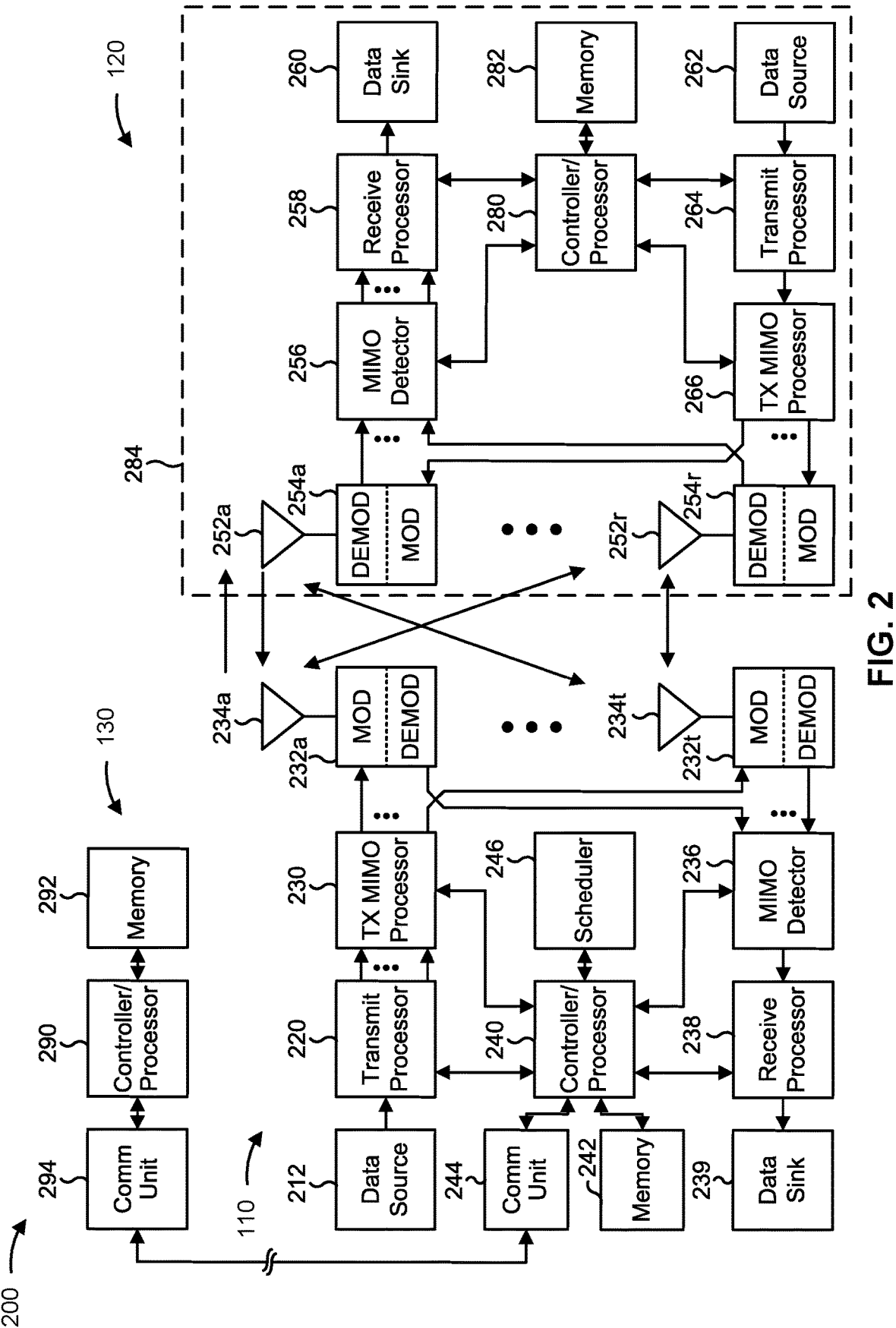
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (for example, as described with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (for example, as described with reference to FIGS. 3-10).

The controller/processor 240 of the base station 110, the controller/processor 280 of the UE 120, and/or any other component(s) of FIG. 2 may perform one or more techniques associated with, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for transmitting a sidelink resource reservation, wherein the sidelink resource reservation indicates a first resource in an uplink slot with a first bandwidth available for the sidelink resource reservation and a second resource in a sub-band full duplex (SBFD) slot with a second bandwidth available for the sidelink resource reservation, and wherein the sidelink resource reservation uses a same sub-channel indexing configuration for the uplink slot and the SBFD slot; and/or means for transmitting a communication using the sidelink resource reservation. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, the UE includes means for transmitting the communication without using the invalid frequency resource of the SBFD slot.

In some aspects, the UE includes means for receiving a sidelink resource reservation, wherein the sidelink resource reservation indicates a first resource in an uplink slot with a first bandwidth available for the sidelink resource reservation and a second resource in an SBFD slot with a second bandwidth available for the sidelink resource reservation, and wherein the sidelink resource reservation uses a same sub-channel indexing configuration for the uplink slot and the SBFD slot; and/or means for decoding a communication based at least in part on the sidelink resource reservation. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, the UE includes means for decoding the communication without using the invalid frequency resource of the SBFD slot.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
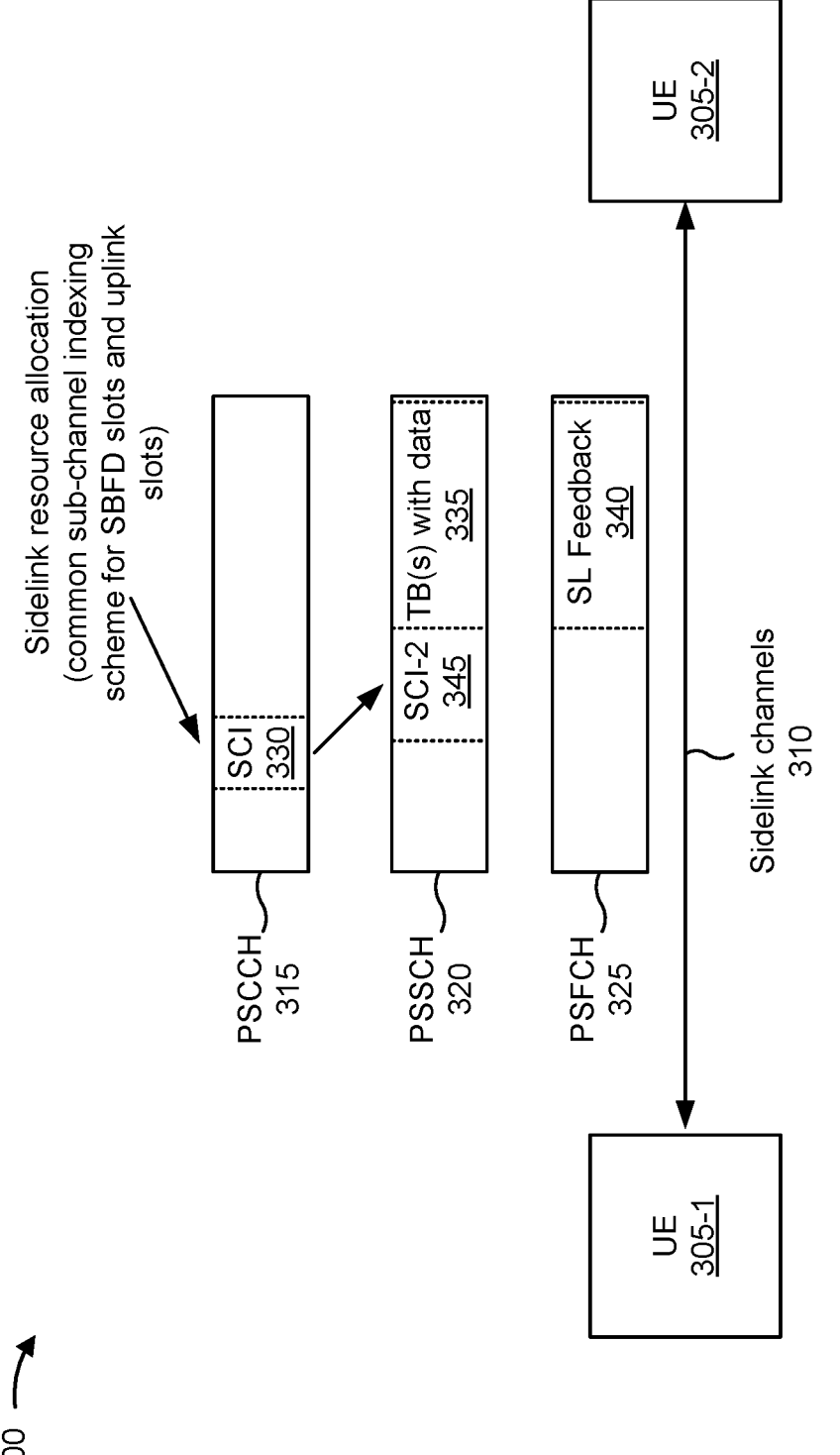
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305)

via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding configuration (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

SCI 330 may include a first part and a second part, which may be referred to as SCI-1 and SCI-2, respectively. SCI-1 may be transmitted on a PSCCH. SCI-1 may include a resource allocation, and may include information for decoding SCI-2 (e.g., a format of SCI-2 and/or other information). The resource allocation may indicate resources for SCI-2 and/or a shared channel (SCH). SCI-2 may be transmitted on a PSSCH. SCI-2 may include information for decoding the SCH. SCI-1 and/or SCI-2 may be encoded and/or decoded using a physical downlink control channel (PDCCH) polar coding/decoding chain.

In some aspects, SCI-2 may be mapped to contiguous resource blocks (RBs) in the PSSCH, starting from a first symbol with a PSSCH demodulation reference signal (DMRS). In some aspects, SCI-2 may be scrambled separately from the SCH. In some aspects, SCI-2 may be modulated using quadrature phase shift keying (QPSK). Since the format of SCI-2 may be indicated by SCI-1, a recipient of SCI-2 may not perform blind decoding of SCI-2, thereby conserving computing resources.

In some aspects, as described elsewhere herein, SCI-1 may indicate a sidelink resource reservation using a common sub-channel indexing configuration for uplink slots and SBFD slots.

As indicated above, FIG. 3 is provided as an example. Other examples may differ from what is described with respect to FIG. 3.

Figure 4:
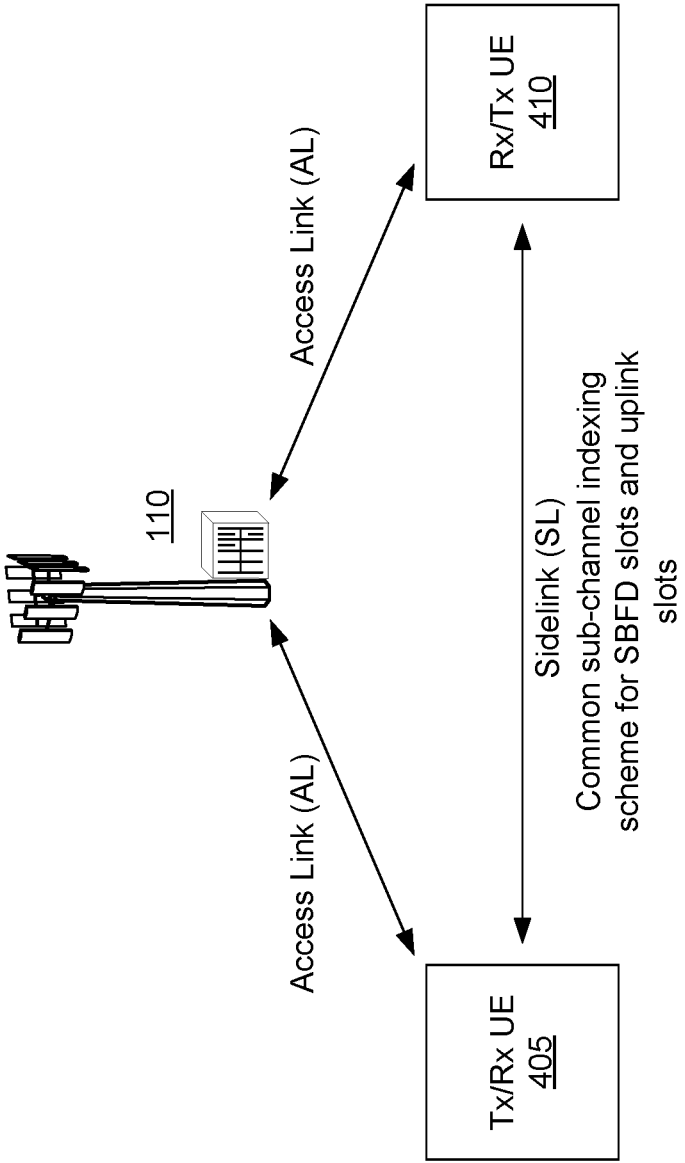
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110). In some aspects, as described elsewhere herein, sidelink communications may be performed via resources of a sidelink resource pool using a common sub-channel indexing configuration for uplink slots and SBFD slots.

As indicated above, FIG. 4 is provided as an example. Other examples may differ from what is described with respect to FIG. 4.

Figure 5:
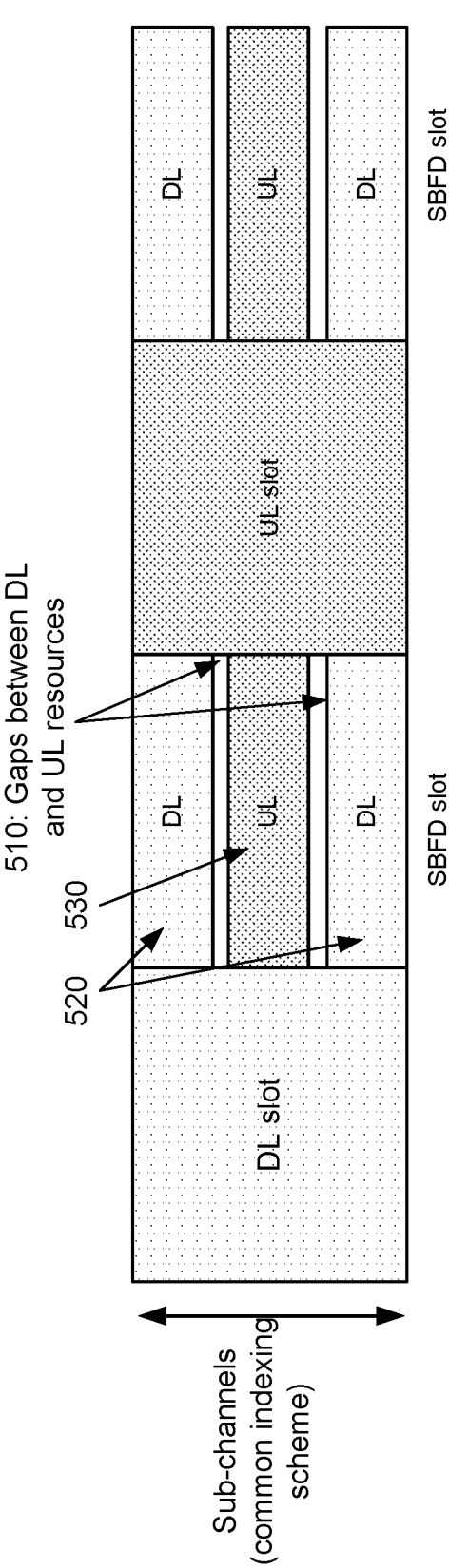
FIG. 5 is a diagram illustrating an example of a sub-band full duplex (SBFD) slot, in accordance with the present disclosure.

FIG. 5 is a diagram illustrating an example 500 of a sub-band full duplex (SBFD) slot, in accordance with the present disclosure. Example 500 shows a downlink (DL) slot, an uplink (UL) slot, and two SBFD slots. A DL slot is a slot that can be used for downlink communication from a base station to a UE (such as via a Uu radio access connection). A UL slot is a slot that can be used for uplink communication from a UE to a base station (such as via a Uu radio access connection) or, in some cases, for sidelink communication between UEs. For example, UEs may communicate on the sidelink (such as using a ProSe Sidelink (PC5) interface) via uplink resources that are configured as sidelink resources, as described elsewhere herein. In some aspects, a UL slot may be configured such that all symbols are uplink symbols (excluding symbols used for gaps, reference signaling, measurement, and so on). In some aspects, a UL slot may be a slot that contains a threshold number of uplink symbols. For example, symbols of a given slot can be configured as downlink symbols, uplink symbols, or another type of symbol. If a threshold number of symbols are configured as uplink symbols, then the given slot may be considered a UL slot. In some aspects, a DL slot may be configured such that all symbols are downlink symbols (excluding symbols used for gaps, reference signaling, measurement, and so on). In some aspects, a DL slot may be a slot that contains a threshold number of downlink symbols. For example, if a threshold number of symbols are configured as downlink symbols, then the given slot may be considered a DL slot.

An SBFD slot is a slot that is configured for SBFD communication. Full-duplex (FD) communication has been introduced as a means to provide increased bandwidth (ideally, double the bandwidth of half-duplex) by allowing a gNB or UE to transmit and receive on the same set of resources, such as the same set of time and frequency (time/frequency) resources. However, due to complications with transmitting and receiving on the same set of resources (e.g., self-interference between downlink and uplink transmission, gNB-to-gNB interference, and UE-to-UE interference) and additional implementation complexity, SBFD is considered as a step to realize some of the benefits of FD communications, while circumventing some of the complications of FD communications. For example, in an SBFD slot, gaps 510 may be configured between downlink resources 520 and UL resources 530, which enables better control of self-interference while improving latency and uplink coverage. The total bandwidth of example 500 may be a bandwidth part (BWP), a component carrier (CC), or the like. SBFD can be implemented at the UE and/or at the base station. For example, a base station may use SBFD to perform FD communication with multiple UEs (such as uplink communication with one UE and downlink communication with another UE in the same slot)

A UE may receive information indicating which slots are SBFD slots. For example, information indicating SBFD slots may be signaled via a common radio resource control (RRC) configuration (such as via a system information block). As another example, information indicating SBFD slots may be signaled via UE-specific signaling, such as UE-specific RRC signaling or another form of signaling. As yet another example, information indicating SBFD slots may be indicated to a UE dynamically (such as by using downlink control information (DCI) or medium access control (MAC) signaling). In some aspects, UL slots and/or symbols and DL slots and/or symbols may be semi-statically configured, such as via RRC signaling.

As shown, and as described in more detail below, the slots may be subdivided into sub-channels, which may be used by a transmitting UE to indicate a sidelink resource reservation. These sub-channels may use a common sub-channel indexing configuration between the UL slot and the SBFD slots, which reduces ambiguity in sidelink resource reservation.

As indicated above, FIG. 5 is provided as an example. Other examples may differ from what is described with regard to FIG. 5.

Figure 6:
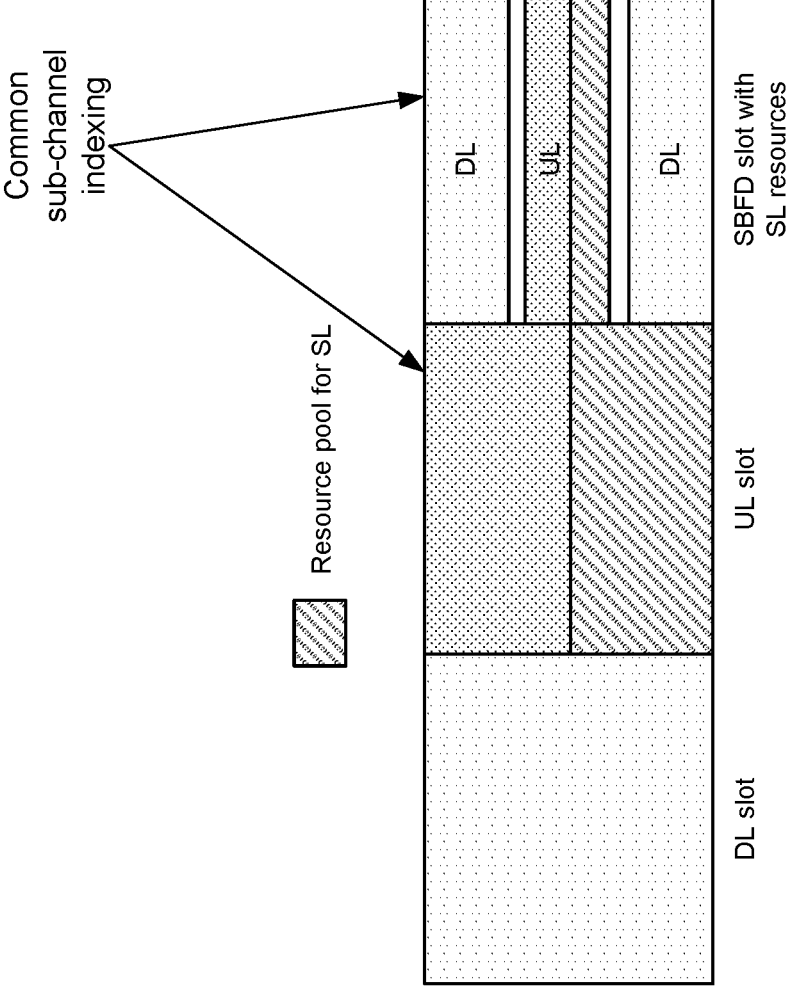
FIG. 6 is a diagram illustrating an example of one or more resource pools, in accordance with the present disclosure.

FIG. 6 is a diagram illustrating an example 600 of one or more resource pools, in accordance with the present disclosure. Example 600 shows a DL slot, a UL slot, and an SBFD slot including sidelink (sometimes abbreviated SL) resources. These slot types are described in more detail in connection with FIG. 5.

As mentioned above, sidelink communications may occur via a resource pool, and may be allowed (e.g., only) on symbols that are semi-statically configured as uplink symbols. A resource pool is a set of time/frequency resources in which a UE is permitted to transmit sidelink communications. It can be seen that a resource pool includes symbols that are semi-statically configured as uplink symbols because a UE may be expected to transmit sidelink communications on such symbols. One or more resource pools in example 600 are indicated by a diagonal fill.

A UE can be configured (e.g., via configuration signaling such as RRC signaling, via pre-configuration such as by an original equipment manufacturer or service provider, or the like) with a set of resource pools, wherein each resource pool is defined as time/frequency resources. The minimum transmission/reception (e.g., resource allocation) unit in time is a sub-channel, wherein each sub-channel is defined as a number of contiguous resource blocks (RBs).

A resource pool can further be configured with one of the two resource allocation modes described in connection with FIGS. 3 and 4. For example, a resource pool can be configured with Mode 1 resource allocation, in which a network entity such as a gNB assigns resources for sidelink transmission. In Mode 1, both dynamic allocation via a DCI format 3-x and configured transmissions (of Type-1, wherein an uplink grant and activation/deactivation signaling for the uplink grant are both provided via RRC signaling, and of Type-2, wherein an uplink grant configuration is provided via RRC signaling and activation/deactivation signaling for the uplink grant are provided via a control channel grant (e.g., via DCI)) are supported. As another example, a resource pool can be configured with Mode 2 resource allocation, in which a UE senses the resources of the resource pool. Based at least in part on the outcome of the sensing (e.g., based at least in part on priority of different transmissions and a reference signal received power (RSRP) determined by the sensing), a UE may autonomously select resources for a transmission. In some deployments, Mode 1 operation may generally be expected for UEs in coverage of a network entity such as a gNB, whereas Mode 2 operation may generally be expected for UEs out of coverage of the network entity.

A UE may receive information indicating a plurality of time/frequency resources for a resource pool, and may identify a set of sidelink slots to be included in the resource pool. For example, the set of sidelink slots may be identified (e.g., selected) from the resources. In some cases, the set of slots that may belong to a sidelink resource pool is denoted by $$\left(t_0^{SL}, t_1^{SL}, \ldots, t_{T_{max}-1}^{SL}\right), \text{ where } 0 \le t_i^{SL} < 10240 \times 2^\mu, 0 \le i < T_{max},$$

where the slot index is relative to slot #0 of the radio frame corresponding to system frame number (SFN) 0 of the serving cell or direct frame number (DFN) 0, and where $\mu$ is a subcarrier spacing of the BWP or CC in question. The set of sidelink slots may include all slots except:

$N_{S\_SSB}$ slots in which a sidelink synchronization signal/ physical sidelink broadcast channel (S-SS/PSBCH) block (S-SSB) is configured;

$N_{nonSL}$ slots in each of which at least one of Y-th, (Y+1)-th, . . . , (Y+X−1)-th OFDM symbols are not semi-statically configured as uplink as per the higher layer parameter tdd-UL-DL-ConfigurationCommon or sl-TDD-Configuration, wherein Y and X are set by the higher layer parameters sl-StartSymbol and sl-Length-Symbols, respectively; and one or more reserved slots, which are determined by the following steps:

a. the remaining slots excluding $N_{S\_SSB}$ slots and $N_{nonSL}$ slots from the set of all the slots are denoted by $$\left(l_0, l_1, \ldots, l_{\left(10240 \times 2^\mu - N_{S_{SSB}} - N_{nonSL} - 1\right)}\right)$$

arranged in increasing order of slot index;

b. a slot $l_r(0 \le r < 10240 \times 2^\mu - N_{S_{SSB}} - N_{nonSL})$ belongs to the reserved slots if $$r = \left\lfloor \frac{m \cdot \left(10240 \times 2^\mu - N_{S_{SSB}} - N_{nonSL}\right)}{N_{reserved}} \right\rfloor.$$

Here, m=0,1, . . . , $N_{reserved}$−1 and $N_{reserved}$=(10240×2$^\mu$− $N_{S_{SSB}}$−$N_{nonSL}$) mod $L_{bitmap}$, wherein $L_{bitmap}$ denotes the length of the bitmap and is configured by higher layers (such as with the configuration information for the resource pool or separately from the configuration information for the resource pool).

The set of sidelink slots may be arranged in increasing order of slot index.

Configuration information for a resource pool (e.g., information identifying a plurality of resources for the resource pool) may indicate a plurality of slots, and a UE may select, from the plurality of slots, a set of slots, as described above. The configuration information may indicate the plurality of slots using a bitmap $(b_0, b_1, \ldots, b_{L_{bitmap}-1})$ associated with the resource pool, wherein $L_{bitmap}$ (e.g., the length of the bitmap) is configured by higher layers, as mentioned above. A slot $$t_k^{SL} \left( 0 \leq k < 10240 \times 2^\mu - N_{S_{SSB}} - N_{nonSL} - N_{reserved} \right)$$

belongs to the set if $b_k = 1$, where $k' = k \bmod L_{bitmap}$. The slots in the set may be re-indexed such that the subscripts i of the remaining slots $$t_i'^{SL}$$

are successive $\{0, 1, \ldots, T'_{max}-1\}$, where $T'_{max}$ is the number of the slots remaining in the set.

Example 600 is an example where Uu operations (e.g., between a UE and a base station) and sidelink operations (e.g., between UEs) are performed in the same bandwidth, such as on the same carrier. This may occur, for example, when a sidelink network is deployed in licensed spectrum. Further, example 600 is an example where at least a gNB (and potentially one or more UEs) supports SBFD operation. Therefore, at least some of the slots of example 600 (e.g., the right-most slot) are configured (dynamically or semi-statically) as SBFD slots. Thus, the bandwidth of the uplink portion of the SBFD slot is smaller than that of the uplink slot of example 600. It can be seen that the smaller bandwidth of the uplink portion of the SBFD slot reduces the bandwidth of the resource pool in the SBFD slot relative to the uplink slot, since the UE cannot use downlink or gap resources for the resource pool. Techniques and apparatuses described herein provide for common sub-channel indexing to be used for the UL slot and the SBFD slot, such that ambiguity does not arise, for example, with regard to whether "sub-channel index X" refers to an Xth sub-channel of the SBFD slot, or an Xth sub-channel of the resource pool in the SBFD slot.

As indicated above, FIG. 6 is provided as an example. Other examples may differ from what is described with regard to FIG. 6.

In a transmission mode where sidelink resource selection and/or scheduling is performed by a UE (e.g., Mode 2 resource allocation), periodic resource reservations and aperiodic resource reservations may be supported. As mentioned above, a UE may transmit a sidelink resource reservation to reserve resources for one or more communications by the UE. An aperiodic resource reservation may reserve a single resource or a group of resources (e.g., without a defined periodicity). A periodic resource reservation may reserve a series of resources based at least in part on a periodicity. For an aperiodic resource reservation, a UE may signal (e.g., via SCI-1) a time and frequency (time/frequency) resource for a transmission, as well as up to two future transmissions. A periodic resource reservation may include information similar to information included in an aperiodic resource reservation (e.g., time/frequency resources for one or more transmissions), in addition to a priority and/or a periodicity associated with the reservation.

In some cases, a resource reservation may reserve a resource that includes a sidelink slot and an SBFD slot. For example, a single reserved resource allocation may include the sidelink slot and the SBFD slot. As another example, a first resource allocation reserved by a resource reservation may include a sidelink slot, and a second resource allocation reserved by a resource reservation may include an SBFD slot (or vice versa). As yet another example, a sidelink resource pool configured for the UE may include both sidelink slots and SBFD slots. However, as described above, an uplink slot may be associated with a different bandwidth than a bandwidth associated with an SBFD slot. Therefore, the uplink slot and the SBFD slot may be associated with different numbers of sub-channels. Since a sidelink resource reservation may identify a frequency allocation of a reserved resource by reference to one or more sub-channel indexes, ambiguity may arise regarding how resource reservations are interpreted for frequency bands or sidelink resource pools including uplink slots and SBFD slots. This ambiguity may reduce the bandwidth that can be effectively addressed, impede sidelink communications of UEs, and reduce throughput.

Some techniques and apparatuses described herein provide signaling for sidelink resource reservation across one or more uplink slots and one or more smaller-bandwidth slots, such as SBFD slots. For example, some techniques and apparatuses described herein provide for a common sub-channel indexing configuration to be used for uplink slots and smaller-bandwidth slots on a given frequency band or in a given sidelink resource pool. Thus, a single sidelink resource reservation can indicate a frequency resource allocation on an uplink slot and a smaller-bandwidth slot such as an SBFD slot, thereby eliminating ambiguity with regard to sidelink resource reservation and improving the bandwidth that can be effectively addressed. Furthermore, the common sub-channel indexing configuration reduces overhead relative to configuring different sub-channel indexing configurations for each slot type in a resource pool. Some techniques and apparatuses described herein provide for sidelink resource reservation or interpretation of a sidelink resource reservation in view of one or more invalid frequency resources (e.g., one or more frequency resources such as sub-channels of an SBFD slot that are not available for reservation), such as by a transmitting UE that transmits a resource reservation, or by a receiving UE that receives the resource reservation. In this way, the bandwidth that can be effectively addressed is increased, sidelink communications of UEs are facilitated, and throughput is improved.

Figure 7:
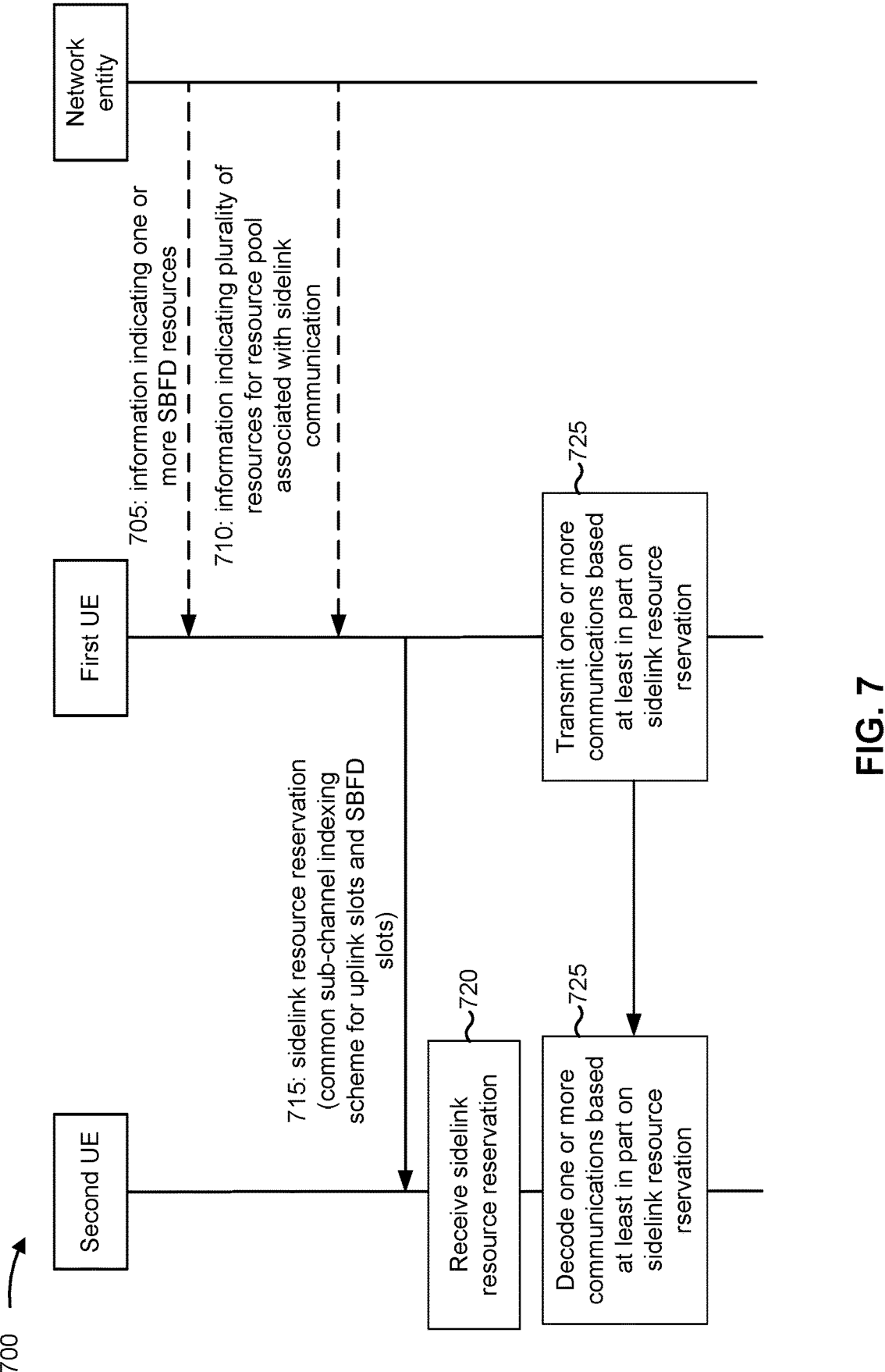
FIG. 7 is a diagram illustrating an example of signaling associated with sidelink resource scheduling, in accordance with the present disclosure.

FIG. 7 is a diagram illustrating an example 700 of signaling associated with sidelink resource scheduling, in accordance with the present disclosure. As shown, example 700 includes a first UE (e.g., UE 120, UE 305, UE 405), a second UE (e.g., UE 120, UE 305, UE 410), and a network entity (e.g., BS 110). In example 700, "uplink slot" refers to a slot semi-statically configured as an uplink slot, or a slot semi-statically configured with at least a threshold number of uplink symbols. Generally, and depending on context, "resource" is used interchangeably with "slot" in example 700. Dashed arrows and boxes indicate optional steps.

The operations of FIG. 7 (and other description herein) is described the context of SBFD resources. However, these operations can be applied for any sort of smaller-bandwidth resource. A smaller-bandwidth resource is a resource that is associated with a smaller bandwidth than another resource, such as a baseline resource (e.g., a resource occupying the entirety of a bandwidth such as a component carrier or a bandwidth part), another resource of a resource pool that includes the smaller-bandwidth resource, or the like. For example, one example of a smaller-bandwidth resource is an SBFD resource, which is associated with a smaller bandwidth than an uplink resource.

As shown in FIG. 7, and by reference number 705, the network entity may provide, to the UE, information indicating one or more SBFD resources (that is, one or more smaller-bandwidth resources). For example, the network entity may provide information indicating one or more SBFD slots. In some aspects, the information indicating one or more SBFD slots may be provided via radio resource control (RRC) signaling, medium access control (MAC) signaling, downlink control information (DCI), or the like. In some aspects, the information indicating one or more SBFD slots may be provided semi-statically. The information indicating the one or more SBFD slots may identify the one or more SBFD slots, and may indicate one or more downlink portions, one or more uplink portions, and/or one or more gap portions of an SBFD slot. In some aspects, the information indicating the one or more SBFD slots may additionally indicate which slots are uplink slots, which slots are downlink slots, or the like. In some aspects, the one or more SBFD slots may be one or more semi-static SBFD slots, such as SBFD slots that are indicated via semi-static signaling.

As shown by reference number 710, the network entity may provide, to the UE, information indicating a plurality of resources (e.g., time/frequency resources) for a resource pool associated with sidelink communication (e.g., a sidelink resource pool). For example, the network entity may provide a resource pool configuration to the UE. The resource pool configuration may include at least part of the information described above in connection with FIG. 6. In some aspects, the information shown by reference number 710 may relate to a single resource pool. In some aspects, the information shown by reference number 710 may relate to multiple resource pools. As shown, the information may indicate a plurality of resources for the resource pool. For example, the network entity may identify the plurality of resources.

In some aspects, the UE may be pre-configured with at least part of the information shown by reference number 705 and reference number 710.

As shown by reference number 715, the first UE may transmit a sidelink resource reservation. For example, the first UE may transmit the sidelink resource reservation via sidelink control information, such as SCI-1. The sidelink resource reservation may indicate one or more resources of a resource pool of the first UE. For example, the sidelink resource reservation may indicate a time resource (e.g., a slot, a group of symbols, a set of slots) and a frequency resource (e.g., one or more sub-carrier indexes corresponding to one or more sub-carriers) for at least one transmission. In some aspects, the sidelink resource reservation may be a periodic resource reservation, in which case the sidelink resource reservation may identify a periodicity for a reserved resource and/or a priority for the reserved resource. In other aspects, the sidelink resource reservation may be an aperiodic resource reservation.

In some aspects, the sidelink resource reservation may identify resources in a first slot and a second slot, where the first slot is configured as an uplink slot and the second slot is configured as an SBFD slot. The first slot can be before the second slot or after the second slot. Additionally, or alternatively, a resource pool of the first UE may include resources in the first slot and the second slot. In such cases, the bandwidth of the first slot may be different than the bandwidth of the second slot, so the first slot and the second slot may be associated with different numbers of sub-channels. Furthermore, some sub-channels in the second slot may be considered invalid for a resource pool or sidelink resource reservation due to such sub-channels being associated with a resource that is not semi-statically configured as an uplink resource. The first UE, the second UE, and/or the base station may use a same indexing configuration for the first slot and the second slot to eliminate ambiguity regarding resource reservation on the first slot and the second slot. For example, the total number of sub-channels can virtually be assumed to be the same in different slots. Hence, the indices of the sub-channels also remain the same.

As mentioned above, a periodic resource reservation may be associated with a periodicity. The periodicity may indicate a length of time between resources reserved by the periodic resource reservation. For example, the periodicity may indicate a first resource (or a first set of resources) for one or more transmissions, and may indicate a periodicity at which the first resource is to recur. The resources reserved by a periodic resource reservation may be referred to herein as periodic reservations, and multiple repetitions of a periodic reservation may be indicated (e.g., at the periodicity associated with the periodic resource reservation). In some cases, a periodic reservation may be associated with a different periodicity than a periodicity of SBFD slots in a resource pool, meaning that some periodic reservations may occur in SBFD slots that contain at least one invalid frequency resource and others may occur in non-SBFD slots (e.g., uplink slots). In some aspects, the first UE may determine a periodic resource reservation such that no repetition of the periodic reservation includes an invalid frequency resource of any SBFD slot. For example, when reserving resources for current and future transmissions, the first UE may ensure that, in no period, indicated PSCCH/PSSCH resources are over invalid frequency resources. The first UE's selection of resources to avoid invalid frequency resources may reduce processing resource usage at the second UE that would otherwise be used to identify invalid frequency resources and interpret the sidelink resource reservation based at least in part on the invalid frequency resources.

In some aspects, the second UE may assume that the first UE does not transmit a repetition in a periodic reservation that occurs in an invalid frequency resource of an SBFD slot. For example, the periodic resource reservation may indicate one or more resources that occur in an invalid frequency resource of an SBFD slot. The second UE may assume that the first UE did not transmit on the indicated one or more resources. The second UE's determination of invalid frequency resources, and interpretation of the sidelink resource reservation based at least in part on the invalid frequency resources, may simplify and improve flexibility of resource reservation for the first UE.

In some aspects, the second UE may assume that a transmission associated with a periodic reservation did not occur if the periodic reservation fully or partially overlaps with at least one invalid frequency resource. For example, the first UE may not transmit a repetition of the periodic reservation if the repetition fully or partially overlaps with the at least one invalid frequency resource. As another example, the second UE may assume that the transmission did not occur if an indicated PSCCH/PSSCH fully or partially overlaps with an invalid frequency resource of an SBFD slot, which simplifies decoding at the second UE.

In other aspects, the transmission associated with the periodic reservation may take place over indicated resources that do not overlap with an invalid frequency resource. For example, the first UE may transmit the communication without using an invalid frequency resource of an SBFD slot. As another example, the transmission may take place over a portion of the indicated PSCCH/PSSCH resources that are not overlapping with invalid symbols of the SBFD slot or invalid resource blocks of a subchannel or invalid subchannels of the indicated PSSCH, which improves resource utilization and efficiency of sidelink communication. As a more specific example, an indicated PSSCH may contain 5 sub-channels, out of which 2 overlap with a set of invalid frequency resources. In this case, even though the first UE signals the transmission on 5 sub-channels, the first UE transmits on 3 sub-channels that are non-overlapped with the set of invalid frequency resources. The second UE may perform decoding on the 3 sub-channels that are non-overlapped with the set of invalid frequency resources. The sidelink resource reservation, when transmitted and decoded only on valid sub-channels of an SBFD slot, may be referred to as a truncated allocation.

In some aspects, when the first UE and/or the second UE truncates a resource allocation of the sidelink resource reservation, the first UE and/or the second UE may use an original (e.g., full, un-truncated) bandwidth of the sidelink resource reservation in subsequent periodic reservations. For example, an indicated PSSCH in a first slot (e.g., an SBFD slot) may contain 5 sub-channels, out of which 2 overlap with a set of invalid frequency resources. In this case, the first UE transmits and the second UE decodes on 3 sub-channels that are non-overlapped with the set of invalid frequency resources. In a second slot (e.g., an uplink slot), after the first slot, all 5 sub-channels are valid for sidelink communication. In the second slot, the first UE transmits and the second UE decodes on all 5 sub-channels of the indicated PSSCH.

In some aspects, when the first UE and/or the second UE truncates a resource allocation of the sidelink resource reservation, the first UE and/or the second UE may continue to use the truncated resource allocation (e.g., a reduced bandwidth of the sidelink resource reservation) in subsequent periodic reservations. For example, an indicated PSSCH in a first slot (e.g., an SBFD slot) may contain 5 sub-channels, out of which 2 overlap with a set of invalid frequency resources. In this case, the first UE transmits and the second UE decodes on 3 sub-channels that are non-overlapped with the set of invalid frequency resources. In a second slot (e.g., an uplink slot), after the first slot, all 5 sub-channels are valid for sidelink communication. In the second slot, the first UE transmits and the second UE decodes on only the 3 sub-channels that were non-overlapped with the set of invalid frequency resources in the first slot. This may enable other sensing UEs to detect the grant in the first slot and determine that the reservation pertains only to the 3 sub-channels that are non-overlapped with the set of invalid frequency resources (thereby enabling the other sensing UEs to use the set of invalid frequency resources for communication).

As shown by reference number 720, the second UE may receive the sidelink resource reservation. In some aspects, the second UE may identify one or more invalid frequency resources of an SBFD slot associated with the sidelink resource reservation. In some aspects, the second UE may truncate one or more periodic reservations of the sidelink resource reservation based at least in part on the one or more periodic reservations overlapping with an invalid frequency resource of an SBFD slot. For example, the second UE may determine to decode a transmission of the first UE only on one or more valid sub-channels of the SBFD slot, as described above.

As shown by reference number 725, the first UE may transmit, and the second UE may decode, one or more communications based at least in part on the sidelink resource reservation. For example, the first UE may transmit the one or more communications on one or more resources (e.g., periodic resources or aperiodic resources) reserved by the sidelink resource reservation. In some aspects, the first UE and the second UE may truncate the one or more resources, for example, based at least in part on the one or more resources overlapping with an invalid frequency resource of an SBFD slot. If the one or more resources are truncated in the SBFD slot, subsequent communications may use an original bandwidth of the one or more resources (before truncation), or may use a truncated bandwidth of the one or more resources, as described above. In this way, ambiguity in sidelink resource reservation for a resource pool including one or more SBFD slots is reduced, throughput is improved, and versatility of sidelink resource reservation is improved.

As indicated above, FIG. 7 is provided as an example. Other examples may differ from what is described with regard to FIG. 7.

FIG. 8 is a diagram illustrating an example 800 of sub-channel indexing associated with sidelink resource scheduling, in accordance with the present disclosure. Example 800 shows a first slot and a second slot. The first slot is an uplink slot, meaning that the first slot is semi-statically configured as an uplink slot or is semi-statically configured with at least a threshold number of uplink signals. The second slot is an SBFD slot, meaning that the second slot is semi-statically configured as an SBFD slot. Valid sub-channels are indicated by a white fill and invalid frequency resources are indicated by a diagonal fill. As mentioned above, a valid sub-channel is a sub-channel that is available for sidelink communication, such as based at least in part on the valid sub-channel being semi-statically configured as uplink resources. As mentioned above, an invalid frequency resource is a sub-channel that is not available for sidelink communication, such as due to the invalid frequency resource being dynamically configurable as uplink or downlink, or being semi-statically configured as downlink.

As shown, a sidelink resource pool in the first slot includes sub-channels 0, 1, 2, and 3. Thus, the first slot has a first bandwidth available for a sidelink resource reservation. However, in the second slot, only two sub-channels are valid sub-channels. Thus, the second slot has a second bandwidth available for the sidelink resource reservation. The invalid frequency resources may be said to be within the first bandwidth (since the invalid frequency resources are valid in the first slot) and not the second bandwidth (since the invalid frequency resources are invalid in the second slot). An invalid frequency resource may be treated as invalid for transmission of the sidelink resource reservation, meaning that a first UE may determine not to schedule and/or transmit a communication on an invalid frequency resource, or that a second UE may determine not to decode a communication on the invalid frequency resource.

As described elsewhere herein, techniques and apparatuses described herein enable common sub-channel indexing to be used for the first slot and the second slot. A common sub-channel indexing configuration means that a same sub-channel index is assigned to a sub-channel occupying a given bandwidth in an uplink slot as in an SBFD slot. In other words, a given sub-channel of a given resource pool has the same index, regardless of slot type (e.g., whether a slot including the given sub-channel is an SBFD slot or an uplink slot). Thus, ambiguity in sub-channel indication for the second slot is eliminated. For example, if common sub-channel indexing were not used, it may be unclear whether a sidelink resource reservation indicating sub-channel index #0 in the first slot and the second slot refers to the sub-channel shown by reference number 810 or the sub-channel shown by reference number 820.

As indicated above, FIG. 8 is provided as an example. Other examples may differ from what is described with regard to FIG. 8.

FIG. 9 is a diagram illustrating an example process 900 performed, for example, by a UE, in accordance with the present disclosure. Example process 900 is an example where the UE (e.g., UE 120, UE 305, UE 405, the first UE of FIG. 7) performs operations associated with sidelink resource scheduling, such as using a common sub-channel indexing configuration.

As shown in FIG. 9, in some aspects, process 900 may include transmitting a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot (block 910). For example, the UE (e.g., using transmission component 1104 or scheduling component 1108, depicted in FIG. 11) may transmit a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot, as described above. In some aspects, the sidelink resource reservation may indicate a resource in one of the uplink slot or the smaller-bandwidth slot, and may use a same sub-channel indexing configuration for the uplink slot and the smaller-bandwidth slot. For example, a resource pool may include the uplink slot and the smaller-bandwidth slot, and may use the same sub-channel indexing configuration.

As further shown in FIG. 9, in some aspects, process 900 may include transmitting a communication using the sidelink resource reservation (block 920). For example, the UE (e.g., using transmission component 1104, depicted in FIG. 11) may transmit a communication using the sidelink resource reservation, as described above.

Process 900 may include additional aspects, such as any single aspect or any combination of aspects described below and/or in connection with one or more other processes described elsewhere herein.

In a first aspect, one or more invalid frequency resources of the smaller-bandwidth slot, that are included in the first bandwidth and not the second bandwidth, are treated as invalid for transmission of the sidelink resource reservation.

In a second aspect, alone or in combination with the first aspect, the second resource is not in an invalid frequency resource of the smaller-bandwidth slot, wherein the invalid frequency resource is in the first bandwidth and not the second bandwidth based at least in part on an SBFD configuration of the smaller-bandwidth slot.

In a third aspect, alone or in combination with one or more of the first and second aspects, the sidelink resource reservation is a periodic reservation, and no repetition of the periodic reservation includes an invalid frequency resource of any smaller-bandwidth slot.

In a fourth aspect, alone or in combination with one or more of the first through third aspects, process 900 includes transmitting the communication without using the invalid frequency resource of the smaller-bandwidth slot.

In a fifth aspect, alone or in combination with one or more of the first through fourth aspects, the repetition that includes the invalid frequency resource is not transmitted.

In a sixth aspect, alone or in combination with one or more of the first through fifth aspects, the repetition that includes the invalid frequency resource is transmitted without using the invalid frequency resource.

In a seventh aspect, alone or in combination with one or more of the first through sixth aspects, the repetition is a first repetition, and a second repetition, that occurs after the first repetition, uses a full bandwidth of the sidelink resource reservation.

In an eighth aspect, alone or in combination with one or more of the first through seventh aspects, the repetition is a first repetition, and a second repetition, that occurs after the first repetition, uses a reduced bandwidth of the sidelink resource reservation that omits the invalid frequency resource.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with the present disclosure. Example process 1000 is an example where the UE (e.g., UE 120, UE 305, UE 410, the second UE of FIG. 7) performs operations associated with sidelink resource scheduling, such as using a common sub-channel indexing configuration.

As shown in FIG. 10, in some aspects, process 1000 may include receiving a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot (block 1010). For example, the UE (e.g., using reception component 1202, depicted in FIG. 12) may receive a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot, as described above.

As further shown in FIG. 10, in some aspects, process 1000 may include decoding a communication based at least in part on the sidelink resource reservation (block 1020). For example, the UE (e.g., using reception component 1202 or decoding component 1208, depicted in FIG. 12) may decode a communication based at least in part on the sidelink resource reservation, as described above.

Process 1000 may include additional aspects, such as any single aspect or any combination of aspects described below and/or in connection with one or more other processes described elsewhere herein.

In a first aspect, one or more invalid frequency resources of the smaller-bandwidth slot, that are included in the first bandwidth and not the second bandwidth, are treated as invalid for the sidelink resource reservation.

In a second aspect, alone or in combination with the first aspect, the second resource is not in an invalid frequency resource of the smaller-bandwidth slot, wherein the invalid frequency resource is in the first bandwidth and not the second bandwidth based at least in part on an SBFD configuration of the smaller-bandwidth slot.

In a third aspect, alone or in combination with one or more of the first and second aspects, the sidelink resource reservation is a periodic reservation, and no repetition of the periodic reservation includes an invalid frequency resource of any smaller-bandwidth slot.

In a fourth aspect, alone or in combination with one or more of the first through third aspects, process 1000 includes decoding the communication without using the invalid frequency resource of the smaller-bandwidth slot.

In a fifth aspect, alone or in combination with one or more of the first through fourth aspects, the repetition that includes the invalid frequency resource is not decoded.

In a sixth aspect, alone or in combination with one or more of the first through fifth aspects, the repetition that includes the invalid frequency resource is decoded without using the invalid frequency resource.

In a seventh aspect, alone or in combination with one or more of the first through sixth aspects, the repetition is a first repetition, and a second repetition, that occurs after the first repetition, uses a full bandwidth of the sidelink resource reservation.

In an eighth aspect, alone or in combination with one or more of the first through seventh aspects, the repetition is a first repetition, and a second repetition, that occurs after the first repetition, uses a reduced bandwidth of the sidelink resource reservation that omits the invalid frequency resource.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
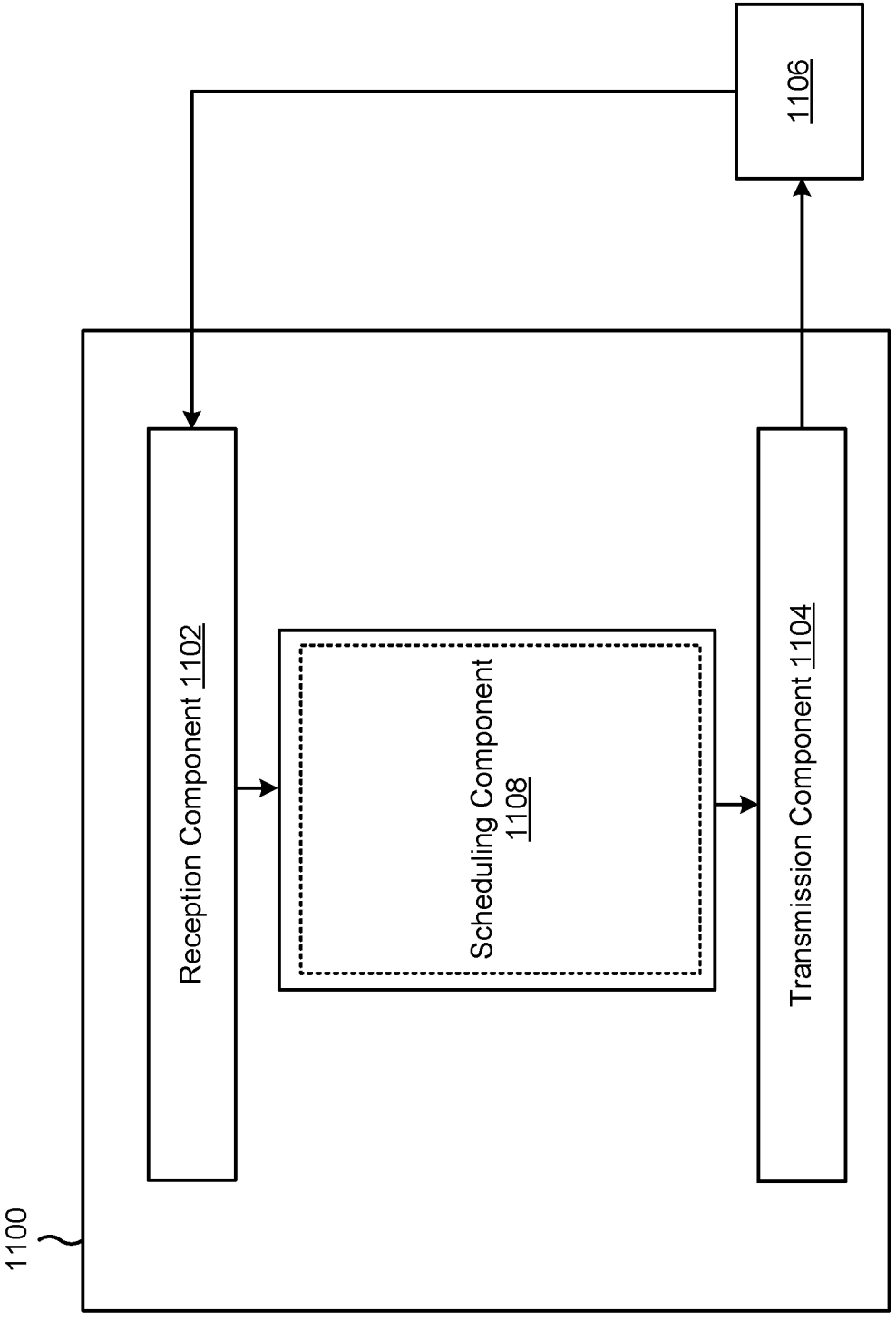
FIGS. 11-12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a scheduling component 1108, among other examples.

In some aspects, the apparatus 1100 may be configured to perform one or more operations described herein in connection with FIGS. 3-8. Additionally, or alternatively, the apparatus 1100 may be configured to perform one or more processes described herein, such as process 900 of FIG. 9 or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The transmission component 1104 may transmit a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot. The transmission component 1104 may transmit a communication using the sidelink resource reservation. The scheduling component 1108 may select resources for the sidelink resource reservation, for example, based at least in part on a resource pool configured for the apparatus 1100, based at least in part on slot types of the resources, based at least in part on semi-static configurations of the resources, or the like.

In some aspects, the transmission component 1104 may transmit the communication without using the invalid frequency resource of the smaller-bandwidth slot.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
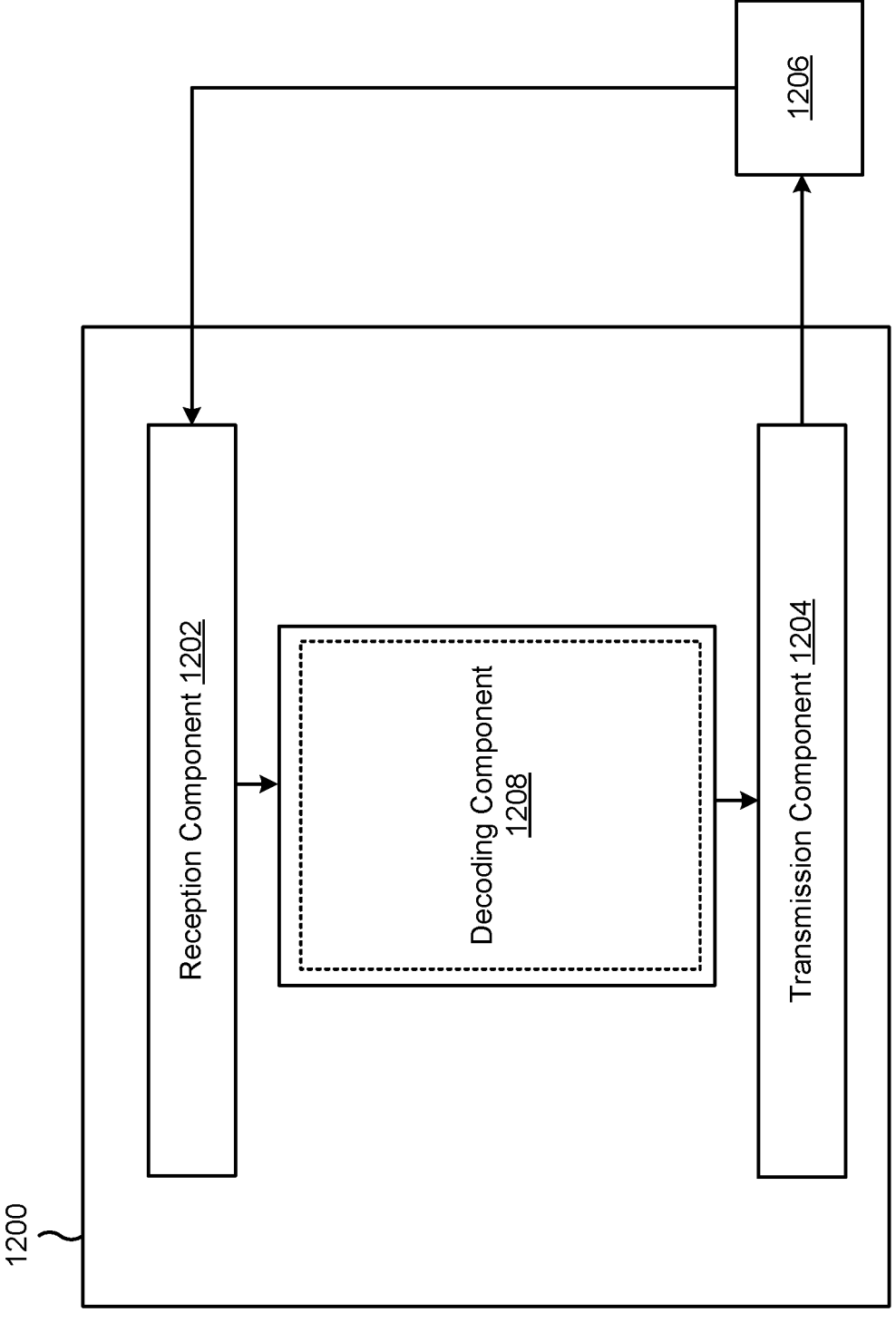

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a decoding component 1208, among other examples.

In some aspects, the apparatus 1200 may be configured to perform one or more operations described herein in connection with FIGS. 3-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 may receive a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot. The reception component 1202 may receive a communication based at least in part on the sidelink resource reservation. The decoding component 1208 may decode the communication based at least in part on the sidelink resource reservation.

In some aspects, the decoding component 1208 may decode the communication without using the invalid frequency resource of the smaller-bandwidth slot.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: transmitting a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and transmitting a communication using the sidelink resource reservation.

Aspect 2: The method of Aspect 1, wherein one or more invalid frequency resources of the smaller-bandwidth slot, that are included in the first bandwidth and not the second bandwidth, are treated as invalid for transmission of the sidelink resource reservation.

Aspect 3: The method of Aspect 1, wherein the second resource is not in an invalid frequency resource of the smaller-bandwidth slot, wherein the invalid frequency resource is in the first bandwidth and not the second bandwidth based at least in part on an SBFD configuration of the smaller-bandwidth slot.

Aspect 4: The method of Aspect 1, wherein the sidelink resource reservation is a periodic reservation, and wherein no repetition of the periodic reservation includes an invalid frequency resource of any smaller-bandwidth slot.

Aspect 5: The method if Aspect 1, wherein the sidelink resource reservation is a periodic reservation, wherein a repetition of the periodic reservation includes an invalid frequency resource of the smaller-bandwidth slot, and wherein transmitting the communication further comprises: transmitting the communication without using the invalid frequency resource of the smaller-bandwidth slot.

Aspect 6: The method of Aspect 5, wherein the repetition that includes the invalid frequency resource is not transmitted.

Aspect 7: The method of Aspect 5, wherein the repetition that includes the invalid frequency resource is transmitted without using the invalid frequency resource.

Aspect 8: The method of Aspect 7, wherein the repetition is a first repetition, and wherein a second repetition, that occurs after the first repetition, uses a full bandwidth of the sidelink resource reservation.

Aspect 9: The method of Aspect 7, wherein the repetition is a first repetition, and wherein a second repetition, that occurs after the first repetition, uses a reduced bandwidth of the sidelink resource reservation that omits the invalid frequency resource.

Aspect 10: The method of Aspect 1, wherein the smaller-bandwidth slot is a sub-band full duplex (SBFD) slot.

Aspect 11: A method of wireless communication performed by a user equipment (UE), comprising: receiving a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and decoding a communication based at least in part on the sidelink resource reservation.

Aspect 12: The method of Aspect 11, wherein one or more invalid frequency resources of the smaller-bandwidth slot, that are included in the first bandwidth and not the second bandwidth, are treated as invalid for the sidelink resource reservation.

Aspect 13: The method of Aspect 11, wherein the second resource is not in an invalid frequency resource of the smaller-bandwidth slot, wherein the invalid frequency resource is in the first bandwidth and not the second bandwidth based at least in part on an SBFD configuration of the smaller-bandwidth slot.

Aspect 14: The method of Aspect 11, wherein the sidelink resource reservation is a periodic reservation, and wherein no repetition of the periodic reservation includes an invalid frequency resource of any smaller-bandwidth slot.

Aspect 15: The method of Aspect 11, wherein the sidelink resource reservation is a periodic reservation, wherein a repetition of the periodic reservation includes an invalid frequency resource of the smaller-bandwidth slot, and wherein decoding the communication further comprises: decoding the communication without using the invalid frequency resource of the smaller-bandwidth slot.

Aspect 16: The method of Aspect 15, wherein the repetition that includes the invalid frequency resource is not decoded.

Aspect 17: The method of Aspect 15, wherein the repetition that includes the invalid frequency resource is decoded without using the invalid frequency resource.

Aspect 18: The method of Aspect 17, wherein the repetition is a first repetition, and wherein a second repetition, that occurs after the first repetition, uses a full bandwidth of the sidelink resource reservation.

Aspect 19: The method of Aspect 17, wherein the repetition is a first repetition, and wherein a second repetition, that occurs after the first repetition, uses a reduced bandwidth of the sidelink resource reservation that omits the invalid frequency resource.

Aspect 20: The method of Aspect 11, wherein the smaller-bandwidth slot is a sub-band full duplex (SBFD) slot.

Aspect 21: An apparatus for wireless communication at a device, comprising a processor; memory coupled with the processor; and instructions stored in the memory and executable by the processor to cause the apparatus to perform the method of one or more Aspects of Aspects 1-20.

Aspect 22: A device for wireless communication, comprising a memory and one or more processors coupled to the memory, the one or more processors configured to perform the method of one or more Aspects of Aspects 1-20.

Aspect 23: An apparatus for wireless communication, comprising at least one means for performing the method of one or more Aspects of Aspects 1-20.

Aspect 24: A non-transitory computer-readable medium storing code for wireless communication, the code comprising instructions executable by a processor to perform the method of one or more Aspects of Aspects 1-20.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
transmit a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and
transmit a communication using the sidelink resource reservation.

2. The UE of claim 1, wherein a given sub-channel of a given resource pool has the same sub-channel index, regardless of slot type, and wherein the given sub-channel includes the first resource and the second resource.

3. The UE of claim 1, wherein one or more invalid frequency resources of the smaller-bandwidth slot, that are included in the first bandwidth and not the second bandwidth, are treated as invalid for transmission of the sidelink resource reservation.

4. The UE of claim 1, wherein the second resource is not in an invalid frequency resource of the smaller-bandwidth slot, wherein the invalid frequency resource is in the first bandwidth and not the second bandwidth based at least in part on a configuration of the smaller-bandwidth slot.

5. The UE of claim 1, wherein the sidelink resource reservation is a periodic reservation, and wherein no repetition of the periodic reservation includes an invalid frequency resource of any smaller-bandwidth slot.

6. The UE of claim 1, wherein the sidelink resource reservation is a periodic reservation, wherein a repetition of the periodic reservation includes an invalid frequency resource of the smaller-bandwidth slot, and wherein, to transmit the communication, the one or more processors are further configured to:
transmit the communication without using the invalid frequency resource of the smaller-bandwidth slot.

7. The UE of claim 6, wherein the repetition that includes the invalid frequency resource is not transmitted.

8. The UE of claim 6, wherein the repetition that includes the invalid frequency resource is transmitted without using the invalid frequency resource.

9. The UE of claim 8, wherein the repetition is a first repetition, and wherein a second repetition, that occurs after the first repetition, uses a full bandwidth of the sidelink resource reservation.

10. The UE of claim 8, wherein the repetition is a first repetition, and wherein a second repetition, that occurs after the first repetition, uses a reduced bandwidth of the sidelink resource reservation that omits the invalid frequency resource.

11. The UE of claim 1, wherein the smaller-bandwidth slot is a sub-band full duplex (SBFD) slot.

12. A UE for wireless communication, comprising:
a memory; and
one or more processors, coupled to the memory, configured to:
receive a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and
decode a communication based at least in part on the sidelink resource reservation.

13. The UE of claim 12, wherein one or more invalid frequency resources of the smaller-bandwidth slot, that are included in the first bandwidth and not the second bandwidth, are treated as invalid for the sidelink resource reservation.

14. The UE of claim 13, wherein the second resource is not in an invalid frequency resource of the smaller-bandwidth slot, wherein the one or more invalid frequency resources are in the first bandwidth and not the second bandwidth based at least in part on a configuration of the smaller-bandwidth slot.

15. The UE of claim 12, wherein the sidelink resource reservation is a periodic reservation, and wherein no repetition of the periodic reservation includes an invalid frequency resource of any smaller-bandwidth slot.

16. The UE of claim 12, wherein the sidelink resource reservation is a periodic reservation, wherein a repetition of the periodic reservation includes an invalid frequency resource of the smaller-bandwidth slot, and wherein, to decoding the communication, the one or more processors are further configured to:

decode the communication without using the invalid frequency resource of the smaller-bandwidth slot.

17. The UE of claim 16, wherein the repetition that includes the invalid frequency resource is not decoded.

18. The UE of claim 16, wherein the repetition that includes the invalid frequency resource is decoded without using the invalid frequency resource.

19. The UE of claim 18, wherein the repetition is a first repetition, and wherein a second repetition, that occurs after the first repetition, uses a full bandwidth of the sidelink resource reservation.

20. The UE of claim 18, wherein the repetition is a first repetition, and wherein a second repetition, that occurs after the first repetition, uses a reduced bandwidth of the sidelink resource reservation that omits the invalid frequency resource.

21. The UE of claim 12, wherein the smaller-bandwidth slot is a sub-band full duplex (SBFD) slot.

22. A method of wireless communication performed by a user equipment (UE), comprising:

transmitting a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and transmitting a communication using the sidelink resource reservation.

23. The method of claim 22, wherein a given sub-channel of a given resource pool has the same sub-channel index, regardless of slot type, and wherein the given sub-channel includes the first resource and the second resource.

24. The method of claim 22, wherein one or more invalid frequency resources of the smaller-bandwidth slot, that are included in the first bandwidth and not the second bandwidth, are treated as invalid for transmission of the sidelink resource reservation.

25. The method of claim 22, wherein the second resource is not in an invalid frequency resource of the smaller-bandwidth slot, wherein the invalid frequency resource is in the first bandwidth and not the second bandwidth based at least in part on a configuration of the smaller-bandwidth slot.

26. The method of claim 22, wherein the sidelink resource reservation is a periodic reservation, and wherein no repetition of the periodic reservation includes an invalid frequency resource of any smaller-bandwidth slot.

27. A method of wireless communication performed by a user equipment (UE), comprising:

receiving a sidelink resource reservation, wherein the sidelink resource reservation indicates a first resource in an uplink slot with a first bandwidth available for the sidelink resource reservation and a second resource in a smaller-bandwidth slot with a second bandwidth available for the sidelink resource reservation, and wherein the sidelink resource reservation uses a same sub-channel indexing configuration for the uplink slot and the smaller-bandwidth slot; and decoding a communication based at least in part on the sidelink resource reservation.

28. The method of claim 27, wherein one or more invalid frequency resources of the smaller-bandwidth slot, that are included in the first bandwidth and not the second bandwidth, are treated as invalid for the sidelink resource reservation.

29. The method of claim 28, wherein the second resource is not in an invalid frequency resource of the smaller-bandwidth slot, wherein the one or more invalid frequency resources are in the first bandwidth and not the second bandwidth based at least in part on a configuration of the smaller-bandwidth slot.

30. The method of claim 27, wherein the sidelink resource reservation is a periodic reservation, and wherein no repetition of the periodic reservation includes an invalid frequency resource of any smaller-bandwidth slot.

* * * * *